United States Patent
Goodwin, III

(10) Patent No.: US 6,236,335 B1
(45) Date of Patent: May 22, 2001

(54) SYSTEM AND METHOD OF TRACKING SHORT RANGE TRANSMITTERS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/718,622

(22) Filed: Sep. 17, 1996

(51) Int. Cl.[7] ........................................... H04Q 1/00
(52) U.S. Cl. .................. 340/825.49; 340/825.54; 340/568; 340/572; 340/573; 342/463; 342/450; 342/451; 235/383; 235/385
(58) Field of Search .................. 340/825.69, 825.72, 340/825.49, 825.36, 825.54, 825.35, 573, 539, 568, 572; 364/516; 395/210; 342/450, 451, 463; 235/383, 385

(56) References Cited

U.S. PATENT DOCUMENTS

| | | | |
|---|---|---|---|
| 4,002,886 | | 1/1977 | Sundelin .......................... 235/61.7 R |
| 4,500,880 | | 2/1985 | Gomersall et al. .............. 340/825.35 |
| 4,929,819 | * | 5/1990 | Collins, Jr. .......................... 235/383 |
| 5,027,314 | * | 6/1991 | Linwood et al. ..................... 364/900 |
| 5,051,741 | * | 9/1991 | Wesby .............................. 340/825.49 |
| 5,172,314 | | 12/1992 | Poland et al. .......................... 364/401 |
| 5,245,534 | | 9/1993 | Waterhouse et al. ................. 364/404 |
| 5,287,266 | * | 2/1994 | Malec et al. .......................... 364/401 |
| 5,396,224 | * | 3/1995 | Dukes et al. ..................... 340/825.49 |
| 5,758,064 | * | 5/1998 | Zimmerman et al. .......... 395/183.19 |

* cited by examiner

Primary Examiner—William A. Cuchlinski, Jr.
Assistant Examiner—Yonel Beaulieu
(74) Attorney, Agent, or Firm—Paul W. Martin; Peter H. Priest

(57) ABSTRACT

A system and method of locating a wireless device in a transaction establishment which relies on signal strength measurements and the known positions of receiving antennae. The system includes a number of transceivers each including a transmitter which transmits a first signal to the wireless device, a plurality of receivers including a plurality of antennae located throughout the transaction establishment and at least one signal strength determining circuit for determining signal strengths of second signals received by the antennae, and a control circuit for controlling transmission of the first signal and reception of the second signals. A storage medium contains the locations for each of the antennae. A computer coupled to the control circuit instructs the control circuit to transmit the first signal and determines a location of the wireless device in the transaction establishment from the signal strengths and from the locations of the antennae. Multiple locations of a wireless device may be tracked and analyzed to yield customer shopping patterns.

20 Claims, 3 Drawing Sheets

SYSTEM AND METHOD OF TRACKING SHORT RANGE TRANSMITTERS

CROSS-REFERENCE TO RELATED APPLICATION

The present invention is related to the following commonly assigned and co-pending U.S. applications:

"Method Of Locating Electronic Price Labels In Transaction Establishments", filed Oct. 5, 1995, invented by Goodwin, and having a Ser. No. 08/539,450;

"Device and Method Of Locating Electronic Price Labels In Transaction Establishments", filed Jan. 30, 1996, invented by Goodwin et al., and having a Ser. No. 08/593,983;

"Method Of Locating Electronic Price Labels In Transaction Establishments", filed Feb. 16, 1996, invented by Goodwin et al., and having a Ser. No. 08/603,007; and "System and Method of Locating Wireless Devices", filed , Sep. 17, 1996 invented by Plocher, and having a Ser. No. 08/718.623.

BACKGROUND OF THE INVENTION

The present invention relates to systems for tracking wireless devices, and more specifically to a system and method of tracking short range transmitters.

In today's retail environment, there may be many different types of wireless devices, such as wireless data terminals, wireless hand-held scanners, wireless electronic shelf labels, wireless voice products, and wireless financial cards. Knowledge of the location of such devices would be helpful to store owners in tracking customer shopping patterns. However, there is currently no method of locating and processing location information for wireless transmitting devices within a transaction establishment.

Therefore, it would be desirable to provide a system and method of locating short range transmitters within a transaction establishment.

SUMMARY OF THE INVENTION

In accordance with the teachings of the present invention, a system and method of tracking short range transmitters in transaction establishments is provided.

The system includes a number of transceivers each including a transmitter which transmits a first signal to the wireless device, a plurality of receivers including a plurality of antennae and at least one signal strength determining circuit for determining signal strengths of second signals received by the antennae, and a control circuit for controlling transmission of the first signal and reception of the second signals. A storage medium contains the locations for each of the antennae. A computer coupled to the control circuit instructs the control circuit to transmit the first signal and determines a location of the wireless device from the signal strengths and from the locations of the antennae.

A method of locating a wireless device transported through an area by a customer includes the steps of storing locations of a plurality of receiving antennae in the area, receiving signals from the wireless device as it is transported by the receiving antennae, determining signal strength measurements for the signals, and determining locations of the wireless device from the signal strength measurements.

It is accordingly an object of the present invention to provide a system and method of tracking short range transmitters in transaction establishments.

It is another object of the present invention to provide a system and method of tracking short range transmitters in transaction establishments which is preferably based upon signal strength measurements from receiving antennae located throughout the transaction establishment.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
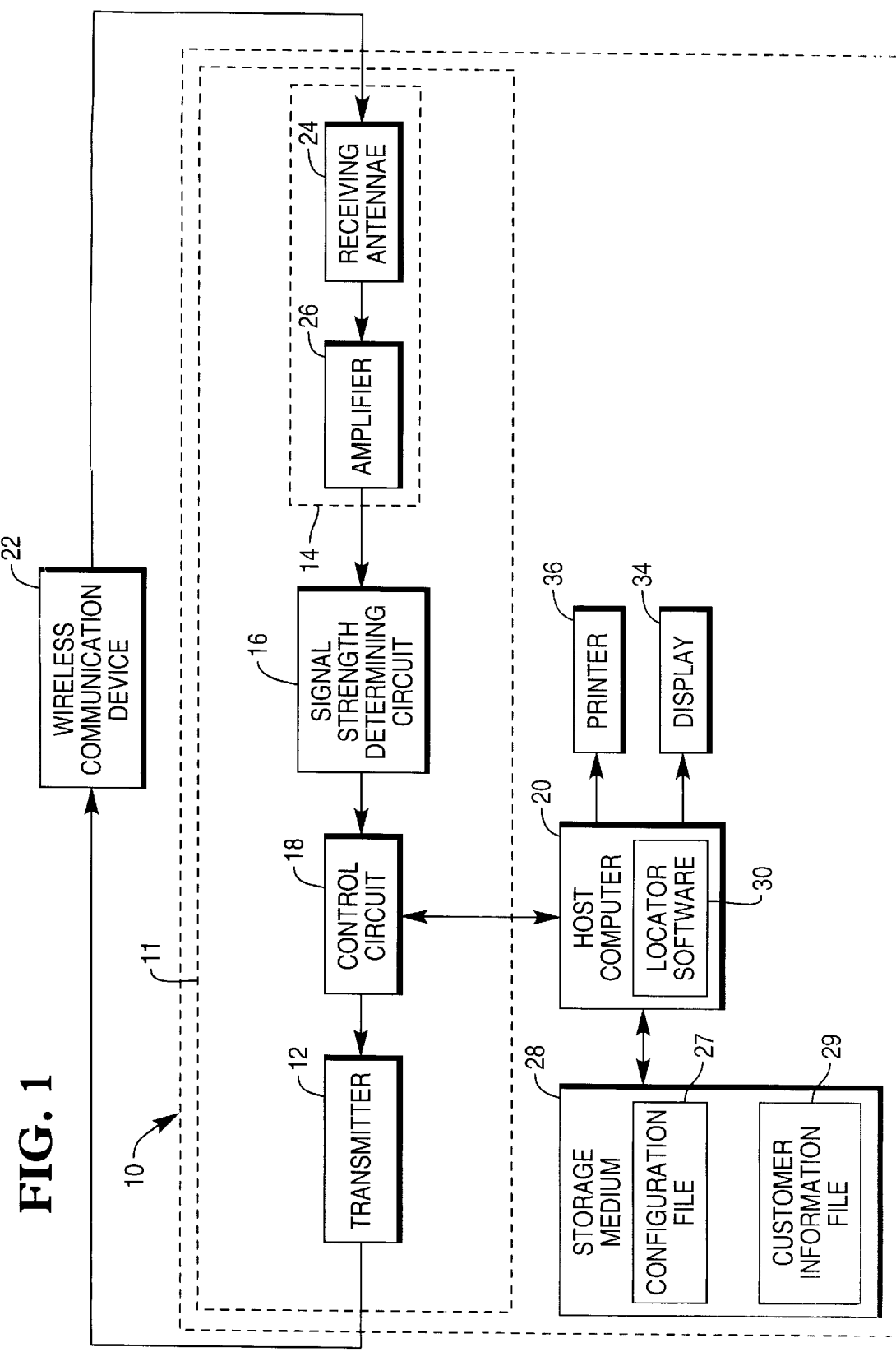
FIG. 1 is a block diagram of a system for locating wireless communication devices.

Referring now to FIG. 1, system 10 includes transceiver 11 and host computer 20.

Transceiver 11 transmits and receives messages from wireless communication device 22. Transceiver 11 includes transmitter 12, receivers 14, and control circuit 18.

Transmitter 12 transmits messages to wireless communication device 22. If wireless communication device 22 is an electronic price label ("EPL"), transmitter 12 transmits price change and status messages addressed to one or more EPLs. If wireless communication device 22 is a wireless data collection terminal, transmitter 12 transmits price and article information when requested.

Receivers 14 receive messages from wireless communication device 22. If wireless communication device 22 is an EPL, receivers 14 receive acknowledgment messages or return data messages (some of the EPLs can talk back). If wireless communication device 22 is a wireless data collection terminal, transmitter 12 receives requests for price and article information.

Receivers 14 each include receiving antennae 24 and an amplifier 26.

Receiving antennae 24 are preferably located separately in the store and coupled to amplifiers 26 through a wire cable.

Amplifiers 26 amplify the received signal from receiving antennae 24. Amplifiers 26 amplify at the same gain.

Signal strength determining circuit 16 determines the signal strengths of messages arriving from receivers 14 and report the signal strengths to host computer 20 through control circuit 18. Alternatively, each receiver 14 may include its own single signal strength determining circuit 16.

Control circuit 18 controls operation of transceiver 11, including routing of transmitted and received information to and from host computer 20.

Host computer 20 controls operation of system 10, which may include many transceivers 11 and many wireless communication devices 22. Additionally, host computer 20 executes locator software 30 which determines the location of wireless communication device 22 from signal strength information from each receiver and physical location information for each receiving antennae. Host computer 20 generates a fix which is displayed on display 34. Physical location information is stored within configuration file 27 in storage medium 28. Host computer 20 is preferably coupled to each transceiver 11 through a wire cable, but could be wireless to these devices.

Wireless communication device 22 is preferably a battery-powered device and may include an electronic price label, a personal identification card, and wireless data collection device, or any other portable transceiver that is capable of being relocated throughout a store.

Figure 2:
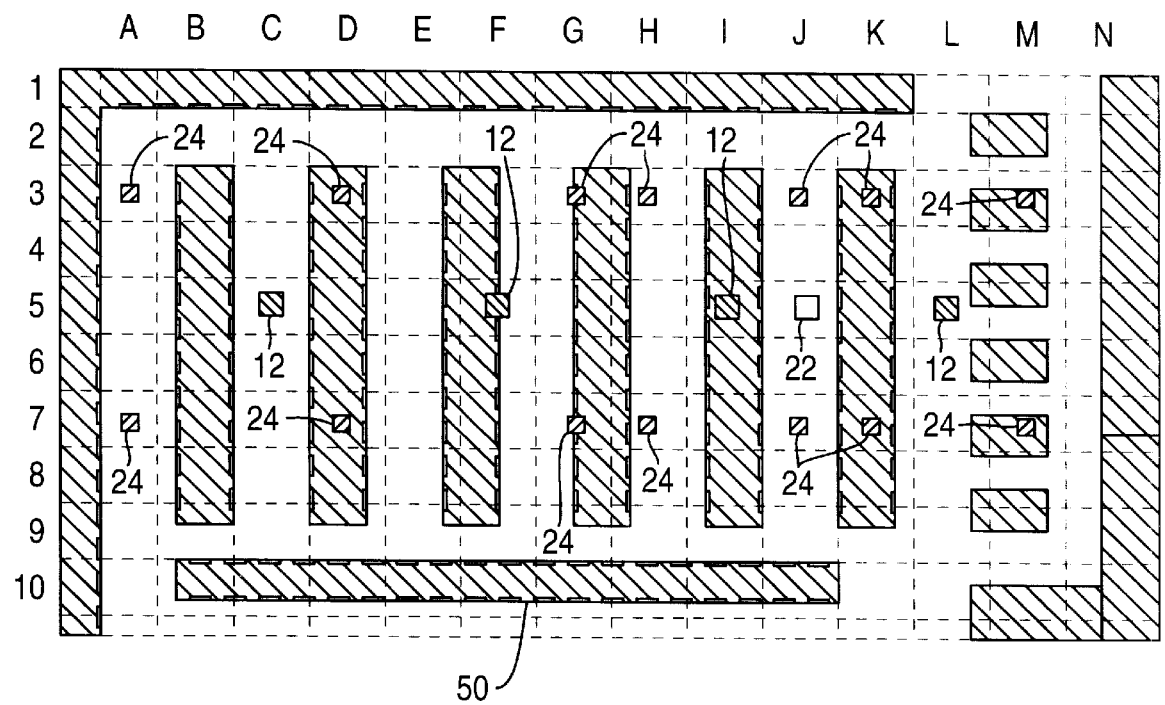
FIG. 2 is a map of a transaction establishment.

Turning now to FIG. 2, a map of a typical store is shown. The map illustrates the physical placement of shelves 50, transmitters 12, and receiving antennae 24. Receiving antennae 24 are located separately from each other and generally around transmitters 12. In addition, the location of wireless communication device 22 is also shown. The locations are referenced to a two-dimensional coordinate system in which rows are identified by numerals and columns are identified by letters.

The map is used by host computer 20 to determine the location of wireless communication device 22 in accordance with the method of the present invention.

In this example, the sought after device 22, is located at position 5J. Receiving antennae 24 are located at 3A, 7A, 3D, 7D, 3G, 7G, 3H, 7H, 3J, 7J, 3K, 7K, 3M, and 7M. Transmitters 12 are located at 5C, 5F, 5I, and 5L.

The store contents, including shelves 50, are assumed to be uniformly transparent to radiation. Also, device 22 is assumed to transmit at the same power level regardless of battery life until the battery fails. A maximum distance correlates with a predetermined minimum threshold strength.

A relative scale method could also be used. A 1–100 scale of closeness could be used. This scale could then be used to determine the location.

Where signal strength is assumed to decrease in a mathematically reproducible equation (e.g., exponential decrease), then fixing is more complicated due to the equations involved.

Figure 3:
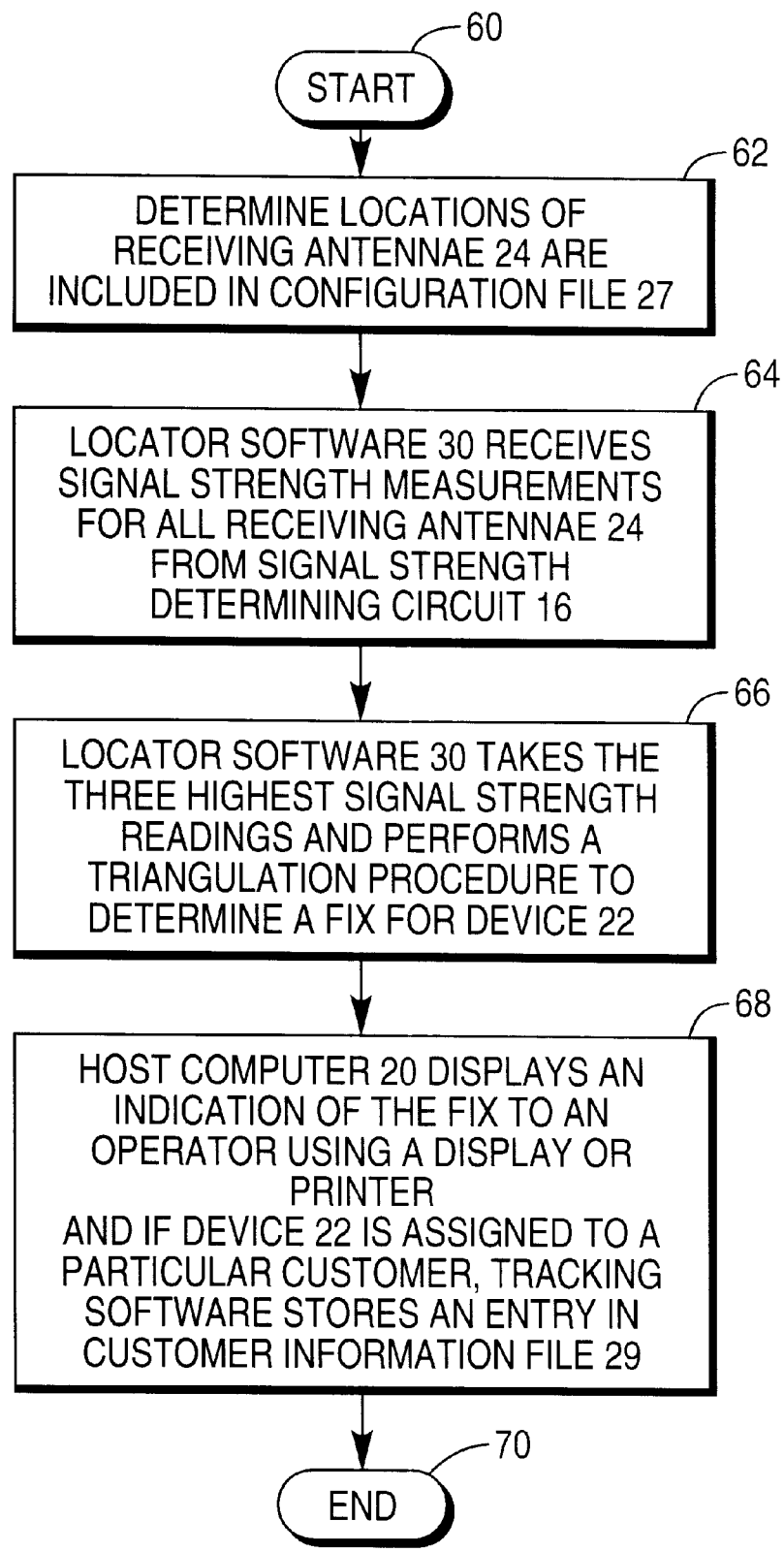
FIG. 3 is a flow diagram illustrating the method of locating the wireless communication devices.

Turning now to FIG. 3, the method of operation of locator software 30 assumes that device 22 is a device that continuously or periodically transmits a signal, or can be made to generate a signal if it is still functioning normally. The operation is explained in more detail, beginning with START 60.

In step 62, the locations of receiving antennae 24 are determined and included in configuration file 27.

In step 64, locator software 30 receives signal strength measurements for all receiving antennae 24 from signal strength determining circuit 16.

In step 66, locator software 30 takes the three highest signal strength readings and performs a triangulation procedure to determine a fix for device 22. Locator software 30 generates a circle around the corresponding receiving sensors 24 having radii equal to the distances translated from the signal strength measurements. The area centered on the intersection of the three circles represents the fix.

In step 68, host computer 20 displays an indication of the fix to an operator using a display 34 or printer. If device 22 is assigned to a particular customer, tracking software stores an entry in customer information file 29 so that the customer's habits can be later gleaned from an inspection of the data in file 29.

In step 70, the method ends.

The system and method of the present invention may be used to track customer shopping patterns for those customers that are using wireless communication devices. The data from customer tracking may be used to rearrange items within the transaction establishment.

Although the present invention has been described with particular reference to certain preferred embodiments thereof, variations and modifications of the present invention can be effected within the spirit and scope of the following claims.

What is claimed is:

1. A system for locating and tracking a pattern of movement of a wireless device in a transaction establishment comprising:

a number of transceivers including
a transmitter which transmits a first signal to the wireless device;
a plurality of receivers, each of said receivers including at least one antenna, the plurality of antennae located throughout the transaction establishment;
at least one signal strength determining circuit for determining signal strengths of second signals received by the antennae; and
a control circuit for controlling transmission of the first signal and reception of the second signals;

a storage medium containing locations for each of the antennae; and a computer coupled to the control circuit which instructs the control circuit to transmit the first signal, which determines a location of the wireless device in the transaction establishment from the signal strengths and from the locations of the antennae, and which tracks the location of the wireless device as the wireless device moves through the transaction establishment to determine the pattern of movement.

2. The system as recited in claim 1, wherein the wireless device is assigned to a customer and wherein the computer determines a plurality of additional locations of the device as the customer moves through the transaction establishment and stores the location and the additional locations to form a record of shopping patterns of the customer.

3. The system as recited in claim 1, wherein each receiver includes a signal determining circuit.

4. The system of claim 1 wherein the wireless device to be located comprises one of a plurality of wireless devices, said wireless device being of one of at least two different types of wireless devices employed in the system.

5. The system of claim 4 wherein the at least two different types of devices comprise electronic price labels and customer operated wireless data collection devices having a wireless transceiver for communicating with a host computer which may be utilized by a customer to receive price information for a product of interest from the host computer.

6. The system of claim 5 wherein said transmitters transmit price and status messages to a plurality of electronic price labels.

7. The system of claim 5 wherein said transmitters transmit price and article information to a plurality of customer operated wireless data collection devices.

8. The system of claim 6 wherein said transmitters transmit price and article information to a plurality of customer operated wireless data collection devices.

9. The system of claim 5 wherein said plurality of receivers receive acknowledgement or return data messages from electronic price labels.

10. The system of claim 5 wherein said plurality of receivers receive requests for price and article information from customer operated wireless data collection devices.

11. The system of claim 9 wherein said plurality of receivers receive requests for price and article information from customer operated wireless data collection devices.

12. The system of claim 2 wherein the computer executes customer tracking software to determine said plurality of additional locations and stores the record of shopping patterns in a customer information file stored in memory so that the customer's habits can be later gleaned from an inspection of the customer information file.

13. The system of claim 2 wherein the device location is displayed on a display as the customer moves with it through the transaction establishment.

14. The system of claim 1 wherein the three highest signal strengths received by three of the plurality of receivers and the stored locations of the antennas for those three receivers are employed by the computer which determines the location of the wireless device by triangulation.

15. A method of locating and tribe a sequence of movements of a wireless device transported through a transaction establishment by a customer comprising the steps of:
    storing locations of a plurality of receiving antennae in a transaction establishment;
    receiving signals from the wireless device as it is transported by the receiving antennae, determining signal strength measurements for the signals; determining locations of the wireless device from the signal strength measurements; and determining the sequence of movements of the wireless device as the wireless device moves through the (transaction establishment.

16. A method of tracking customer shipping patterns through a transaction establishment comprising steps of;
    storing locations of a plurality of receiving antennae located in the transaction establishment;
    identifying a wireless device as being associated with a customer receiving signals from the wireless device as it is transported by the customer by the receiving antennae;
    determining signal strength measurements for the signals;
    determining locations of the wireless device as the customer moves through the transaction establishment; and
    storing the locations as locations of the customer.

17. The method of claim 16 further comprising the steps of: receiving a customer request for price and article information; and transmitting the price and article information to the wireless device.

18. The method of claim 16 further comprising the step of:
    storing customer tracking data in a customer information file stored in memory so that the customer's habits can be later gleaned from an inspection of the customer tracking data.

19. The method of claim 16 wherein the step of storing locations of a plurality of receiving antennae in a transaction further comprises the step of assigning a two-dimensional coordinate reference to each antenna which maps the physical location of each antenna to a two-dimensional coordinate system for the transaction establishment.

20. The method of claim 19 wherein said two-dimensional coordinate system is further utilized to map the location of each antenna to a physical placement of shelves within the transaction establishment.

* * * * *

UNITED STATES PATENT AND TRADEMARK OFFICE
CERTIFICATE OF CORRECTION

PATENT NO.    : 6,236,335 B1
DATED         : May 22, 2001
INVENTOR(S)   : John C. Goodwin III It is certified that error appears in the above-identified patent and that said Letters Patent is hereby corrected as shown below:

<u>Column 5,</u>
Line 15, delete "tribe" and substitute -- tracking --.
Line 27, delete "shipping" and substitute -- shopping --.

<u>Column 6,</u>
Line 2, after "customer" insert -- ; --.

Signed and Sealed this

Sixteenth Day of April, 2002

Attest:

JAMES E. ROGAN
Attesting Officer       Director of the United States Patent and Trademark Office